United States Patent
Tsai et al.

(10) Patent No.: US 9,823,123 B2
(45) Date of Patent: Nov. 21, 2017

(54) SYSTEM AND METHOD FOR CONTROLLING EXCESS BIAS OF SINGLE PHOTON AVALANCHE PHOTO DIODE

(71) Applicant: INDUSTRIAL TECHNOLOGY RESEARCH INSTITUTE, Hsinchu (TW)

(72) Inventors: Chia-Ming Tsai, Hsinchu (TW); Po-Hsuan Chang, Taipei (TW); Ming-Ching Kuo, Yijhu Township (TW); Tzu-Yi Yang, Taoyuan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 245 days.

(21) Appl. No.: 14/753,968

(22) Filed: Jun. 29, 2015

(65) Prior Publication Data

US 2016/0223397 A1    Aug. 4, 2016

(30) Foreign Application Priority Data

Jan. 30, 2015   (TW) .............................. 104103182 A

(51) Int. Cl.
*H01J 40/14*    (2006.01)
*G01J 1/44*     (2006.01)

(52) U.S. Cl.
CPC ........... *G01J 1/44* (2013.01); *G01J 2001/442* (2013.01); *G01J 2001/4466* (2013.01)

(58) Field of Classification Search
CPC . G01J 1/44; G01J 2001/442; G01J 2001/4466

(Continued)

(56) References Cited

U.S. PATENT DOCUMENTS

| 4,479,052 A | 10/1984 | Suzuki |
| 6,384,663 B2 | 5/2002 | Cova et al. |

(Continued)

FOREIGN PATENT DOCUMENTS

| CN | 203276080 U | 11/2013 |
| CN | 103557950 A | 2/2014 |

(Continued)

OTHER PUBLICATIONS

Taiwanese Office Action and Search Report, dated Feb. 18, 2016, for Taiwanese Application No. 104103182.

(Continued)

*Primary Examiner* — Kevin Pyo
(74) *Attorney, Agent, or Firm* — Birch, Stewart, Kolasch & Birch, LLP

(57) ABSTRACT

A system for controlling excess bias of a single photon avalanche photo diode (SPAD) is provided. The system includes a power supply, a SPAD, a control circuit and a load. The power supply generates a supply voltage. The SPAD has a first terminal receiving the supply voltage and a second terminal generating an output voltage signal. The control circuit is connected to the second terminal of the SPAD. The load has a first terminal connected to the second terminal of the SPAD, and a second terminal connected to the control circuit for receiving a reset level. The control circuit is capable of monitoring a swing of the output voltage level and generating the reset level in response to the excess bias level and the swing of the output voltage level.

16 Claims, 12 Drawing Sheets

(58) Field of Classification Search
USPC .................. 250/214 R, 214 LA, 214.1, 207; 327/513–515

See application file for complete search history.

(56) References Cited

U.S. PATENT DOCUMENTS

| | | | |
|---|---|---|---|
| 6,812,464 | B1 | 11/2004 | Sobolewski et al. |
| 7,217,914 | B2 | 5/2007 | Stewart et al. |
| 8,476,594 | B2 | 7/2013 | Frach et al. |
| 8,519,340 | B2 | 8/2013 | Frach et al. |
| 8,779,543 | B2 | 7/2014 | Nemirovsky et al. |
| 8,841,740 | B2 | 9/2014 | Brunel et al. |
| 8,901,475 | B1 * | 12/2014 | Joffe ................ H03F 3/087 250/214 A |
| 9,354,113 | B1 * | 5/2016 | Hayat .............. H04B 10/693 |
| 2006/0131480 | A1 | 6/2006 | Charbon et al. |
| 2011/0291017 | A1 | 12/2011 | Frach |
| 2012/0075615 | A1 | 3/2012 | Niclass et al. |
| 2013/0112855 | A1 | 5/2013 | McLeod |
| 2013/0154044 | A1 | 6/2013 | Brunel et al. |
| 2014/0061443 | A1 | 3/2014 | Jiang et al. |
| 2014/0191115 | A1 | 7/2014 | Webster et al. |

FOREIGN PATENT DOCUMENTS

| | | |
|---|---|---|
| CN | 104156022 A | 11/2014 |
| CN | 104199502 A | 12/2014 |
| CN | 104262194 A | 12/2014 |
| TW | 571478 | 1/2004 |
| TW | 201340355 A | 10/2013 |

OTHER PUBLICATIONS

Al-Rawhani et al., "Photocurrent Dependent Response of a SPAD biased by a charge pump", IEEE, 2011, pp. 789-792.

Charbon, "Single-photon imaging in complementary metal oxide semiconductor processes", Phil. Trans. R. Soc. A, 372:20130100, 2014, pp. 1-31.

Mandai et al., "A 3.3-to-25V all-digital charge pump based system with temperature and load compensation for avalanche photodiode cameras with fixed sensitivity", JINST, 8:P03013, 2013, pp. 1-11.

Niclass et al., "A Miniature Actively Recharged Single-Photon Detector Free of Afterpulsing Effects with 6ns Dead Time in a 0.18 μm CMOS Technology", IEEE, 2010, pp. 14.3.1-14.3.4.

Pancheri et al., "Characterization and Modeling of Breakdown Probability in Sub-Micrometer CMOS SPADs", IEEE Journal of Selected Topics in Quantum Electronics, vol. 20, No. 6, Nov./Dec. 2014, pp. 1-8.

Tisa et al., "Variable-Load Quenching Circuit for single-photon avalanche diodes", Optics Express, Feb. 4, 2008, vol. 16, No. 3, pp. 2232-2244.

Vilella et al., "Characterization of temperature effects on single-photon avalanche diodes fabricated in a HV-CMOS conventional technology", DTIP, 2013, pp. 1-5.

Xu et al., "Characterization of Single-Photon Avalanche Photodiodes in CMOS 150nm Technology", Optical Sensing and Detection III, Proc. of SPIE, vol. 9141, 2014, pp. 91410A-1-91410A-6.

Chinese Office Action and Search Report for Chinese Application No. 201510088134.8, dated Mar. 1, 2017.

* cited by examiner

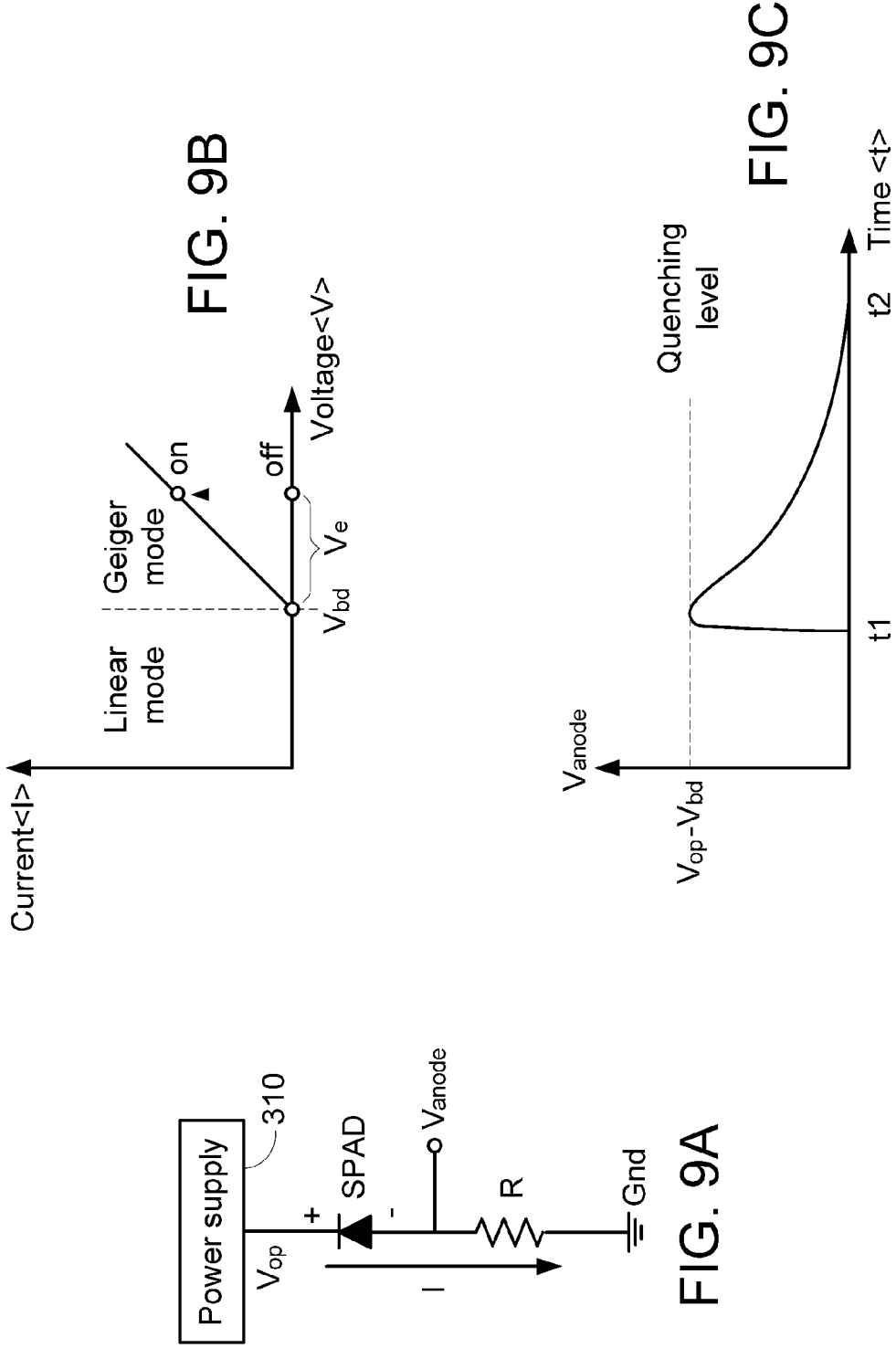

SYSTEM AND METHOD FOR CONTROLLING EXCESS BIAS OF SINGLE PHOTON AVALANCHE PHOTO DIODE

This application claims the benefit of Taiwan application Serial No. 104103182, filed Jan. 30, 2015, the disclosure of which is incorporated by reference herein in its entirety.

TECHNICAL FIELD

The disclosure relates in general to a system and a method for controlling a bias of a diode, and more particularly to a system and a method for controlling an excess bias of a single photon avalanche photo diode (SPAD).

BACKGROUND

In general, the operation regions of photo detectors can be divided into three modes, including linear integration photo diodes (PD), linear-mode avalanche photo diodes (APD) and Geiger-mode avalanche photo diodes (APD) or namely single photon avalanche photo diodes (SPAD).

Please refer to FIG. 1, which illustrates a bias operating region and an optical gain of varied photoelectric detectors. As the PD is operated at a low reverse bias region, the optical gain of the PD is not high and each photon induces at most one electron-hole pair.

The PD operated just below its breakdown voltage is known as a linear-mode APD. A working voltage (also known as a bias voltage) of the APD is near and larger than a breakdown voltage level which is $-V_{bd}$. That is to say, the absolute value of the bias voltage is smaller than the absolute value of the breakdown voltage level $-V_{bd}$.

The SPAD is operated at a Geiger mode. A bias voltage of the SPAD is smaller than a breakdown voltage level $-V_{bd}$. That is to say, the absolute value of the bias voltage is larger than the absolute value of the breakdown voltage level $-V_{bd}$. For example, the bias voltage is $-(V_{bd}+V_e)$, $V_e$ is an excess bias level, and $V_e$ is positive. Under a high electric field, an optical gain of the SPAD whose order of magnitude is as high as $10^6$ is very good in its sensitivity.

Please refer to FIG. 2, which illustrates a relationship between a load current $I_{load}$ and the excess bias level $V_e$ of the SPAD with the charge pump as the power supply. The SPAD and the load are cascoded between a supply voltage $V_{op}$ and a ground voltage, and assume a temperature is kept at a particular value. As known from FIG. 2, when the load current $I_{load}$ is quiescent, the excess bias level $V_e$ is at a maximum; when the load current $I_{load}$ is increased, the excess bias level $V_e$ is decreased with the supply voltage $V_{op}$. Furthermore, the excess bias level $V_e$ will affect the sensitivity of the SPAD. As the load current $I_{load}$ is increased, the excess bias level $V_e$ will be decreased, then desensitizing the SPAD.

Please refer to FIG. 3, which illustrates a relationship between the temperature T and the excess bias level $V_e$ of the SPAD with the charge pump as the power supply. The SPAD and the load are cascoded between the supply voltage $V_{op}$ and the ground voltage, and assume the load current $I_{load}$ is kept at a particular value. As known from FIG. 3, as the temperature T is increased, the breakdown voltage level $V_{bd}$ will be raised, thus decreasing the excess bias level $V_e$. The reduced excess bias level $V_e$ will deteriorate the sensitivity of the SPAD. When the temperature T is increased, the excess bias level $V_e$ will be decreased, then desensitizing the SPAD.

Based on the above, it is known that the breakdown voltage level $V_{bd}$ and the supply voltage $V_{op}$ may drift upon the environment. Therefore, it's very important to stabilize the bias voltage of the SPAD and keep a constant excess bias level $V_e$ against process, voltage, and temperature (PVT) variations.

Please refer to FIG. 4, which illustrates a bias adjusting circuit of an ordinary SPAD. The bias adjusting circuit adjusts the bias of the operating diode 54 according to the dark count rates (DCR) of a reference diode 26, such that the excess bias is kept at a fixed value.

As shown in FIG. 4, the reference diode 26 shielded by a light opaque housing 36 is electrically connected to an active quenching circuit (AQR) 44 and a reference voltage $V_{ref}$. Further, a gate counter 46 can count the dark count rate (DCR) in a predefined time period. Then, the gate counter 46 outputs a first digital word to a controller 48 according to the DCR. The controller 48 outputs a second digital word to a digital-to-analog converter (DAC) 50 according to a lookup table. The DAC 50 controls a variable voltage source 52 to output a bias voltage $V_{bias}$ to the operating diode 54.

Based on the above, the bias adjusting circuit of the ordinary SPAD estimates the level of the breakdown voltage according to the DCR of the reference diode 26, and then adjusts the bias of the operating diode 54. In the bias adjusting circuit of the ordinary SPAD, the reference diode 26 is independent from the operating diode and shielded by a light opaque housing 36.

Please refer to FIG. 5, which illustrates a temperature compensated and control circuit of an ordinary SPAD. The temperature compensated and control circuit measures a breakdown voltage of the reference diode 58 and adjusts the bias voltage of another operating diode.

As shown in FIG. 5, the reference diode 58 is electrically connected to a recharging circuit 60. An analog-to-digital converter (A/D) 62 measures the breakdown voltage of the reference diode 58 and outputs a first digital word to a bias control circuit 64. The bias control circuit 64 outputs a second digital word to a DAC 66. The DAC 66 can control a variable voltage source 68 to output the bias voltage $V_{bias}$ to the operating diode 70.

Based on the above, the temperature compensated and control circuit of the ordinary SPAD adjusts the bias of the operating diode 70 according to the level of the breakdown voltage of the reference diode 58. In the temperature compensated and control circuit of the ordinary SPAD, the reference diode 58 is independent from the operating diode and shielded.

Please refer to FIG. 6, which illustrates a temperature and load compensated method performed in a SPAD. The temperature and load compensated method adjusts an output voltage of a digital charge pump (DCP) 80 to control the excess bias of the SPAD according to the DCR and the pulse width of the reference diodes.

As shown in FIG. 6, the temperature and load compensated circuit includes the digital charge pump (DCP) 80, an array emulator 82, an environment monitor 84, a FPGA and host 86, and digital control oscillator (DCO) 88.

Since the DCR and the pulse width are related to the variations of the temperature and the excess bias, the FPGA and host 86 receives the signal generated by the environment monitor 84, calculates the DCR and the pulse width, and controls the DCO 88 and the DCP 80 to output the supply voltage $V_{op}$ for adjusting the excess bias of the reference diodes 89a to 89c.

Based on the above, the temperature and load compensated method of the SPAD adjusts the supply voltage $V_{op}$ and accordingly the excess bias according to the variations of the DCR and the pulse width. To compensate the temperature and load variations of the ordinary SPAD, the reference SPADs 89*a* to 89*c* are independent from the operating diodes and shielded.

Please refer to FIGS. 7A and 7B, which illustrate an ordinary high dynamic photo detector and an operating method thereof. As shown in FIG. 7A, the high dynamic photo detector includes a PIN diode 112, a SPAD 116, a sensing transistor 114, a reading transistor 118 and a reset transistor 120. The PIN diode 112 is operated at the linear integration mode, and the SPAD 116 is operated at the Geiger mode. The high dynamic photo detector switches the operation between the linear mode and the Geiger mode according to a light flux.

As shown in FIG. 7B, in step 180, the high dynamic photo detector detects the light condition 180. In step 188, when the brightness is larger than or equal to the threshold value, then it is operated at the linear mode. In step 184, when the brightness is not larger than or equal to the threshold value, then it is operated at the Geiger mode. In the step 186, if the output is not saturated, it is kept at the Geiger mode. In the step 186, if the output is saturated, it is switched to the linear mode (step 188). In step 190, at the linear mode 188, if the noise is less than or equal to a threshold value, then it is switched to the Geiger mode (step 184). If the noise is not less than or equal to the threshold value, then it is kept at the linear mode (step 188).

Because the high dynamic photo detector achieves the performance by switching operation between the linear mode and the Geiger mode, the signal processing circuit is much complex.

Please refer to FIG. 8, which illustrates an environment light detecting system and method. As shown in FIG. 8, a sensing element 200 includes a substrate 202, a light emitting diode 204, a SPAD array 206, a filter 208, an etalon filter 210, a lens 209, a lens 211 and a brown window 212. An infrared light can pass the brown window 212. The SPAD array 206 includes a Raw SPAD (i.e. a first unfading pixel 214), IR light passed SPAD (i.e. a second unfading pixel 216, and an opaque metal SPAD (i.e. fading pixel 218).

When the brightness of the environment is larger than a threshold value, the sensing element 200 can be performed by the fading pixel 218. When the brightness of the environment is lower than the threshold value, the sensing element 200 can be performed by the first unfading pixel 214 and the second unfading pixel 216.

The sensing element 200 needs a calibration circuit calibrating the mismatch between the fading pixel 218 and the first unfading pixel 214 (or the second unfading pixel 216) to avoid an inaccuracy of the sensing element 200.

SUMMARY

The disclosure is directed to a system and a method for controlling an excess bias of a single photon avalanche photo diode (SPAD). A new circuit is used for accurately controlling the excess bias to obtain a high dynamic imager.

According to a present disclosure, a system for controlling an excess bias of a single photon avalanche photo diode (SPAD) is provided. The system includes a power supply, a SPAD, a control circuit and a load. The power supply generates a supply voltage. The SPAD has a first terminal receiving the supply voltage and a second terminal generating an output voltage signal. The control circuit is connected to the second terminal of the SPAD. The control circuit obtains a reset level according to a swing of the output voltage signal and an excess bias level. The load has a first terminal connected to the second terminal of the SPAD and a second terminal connected to the control circuit for receiving the reset level.

According to a present disclosure, a method for controlling an excess bias of a single photon avalanche photo diode (SPAD) is provided. The method includes the following steps. A SPAD being operated at a Geiger mode is controlled. A first terminal of the SPAD is connected to a power supply. A second terminal of SPAD generates an output voltage signal. A first terminal of a load is connected to the second terminal of the SPAD. A second terminal of the load receives a reset level. A swing of the output voltage signal is monitored and the reset level is obtained according to the swing of the output voltage signal and an excess bias level, when the SPAD induces a sensing current. The reset level is provided to the second terminal of the load.

BRIEF DESCRIPTION OF THE DRAWINGS

FIGS. 9A to 9C illustrate a SPAD detecting circuit and signals thereof.

Figure 1:
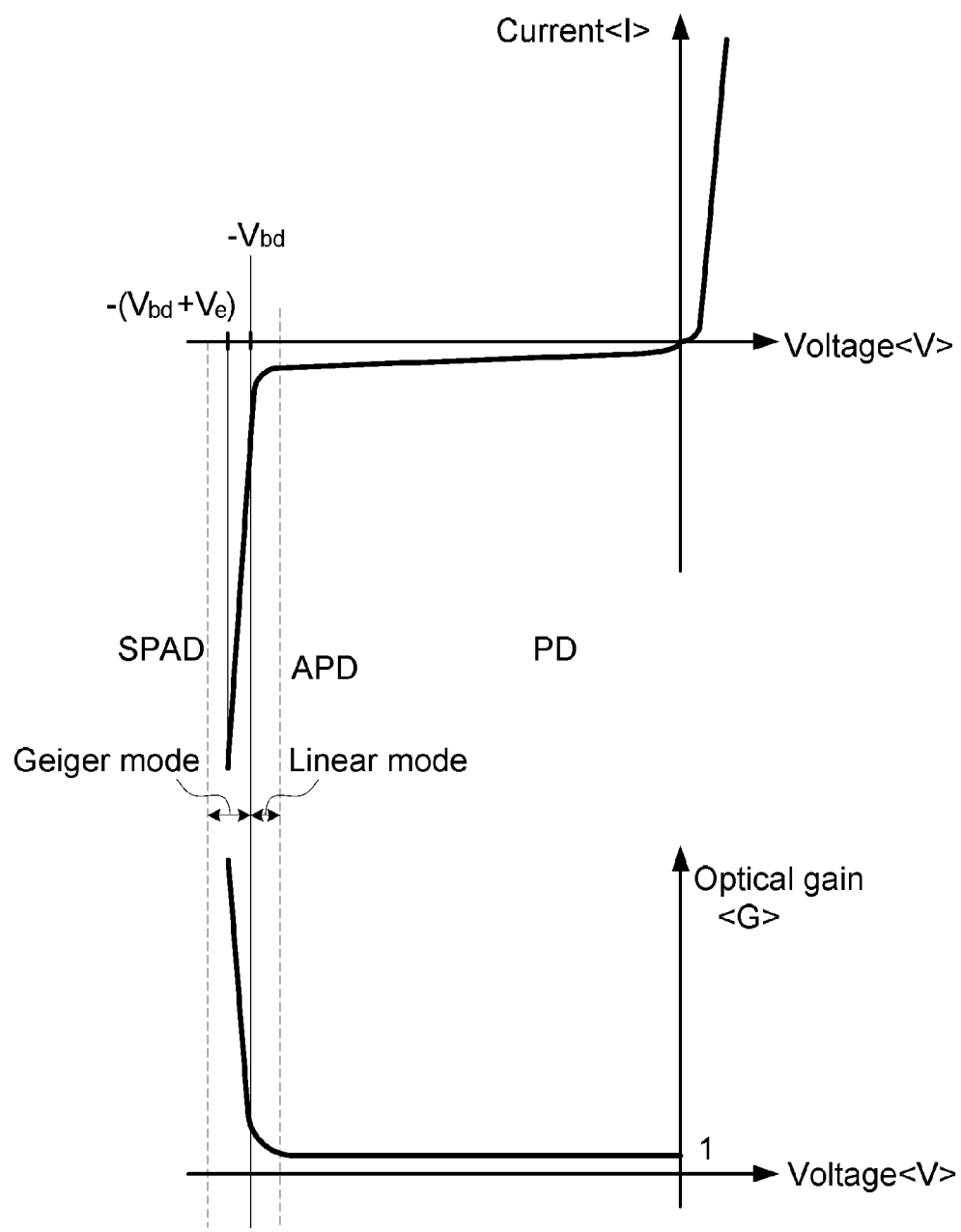
FIG. 1 (prior art) illustrates a bias operating region and an optical gain of varied photoelectric detectors.
Figure 2:
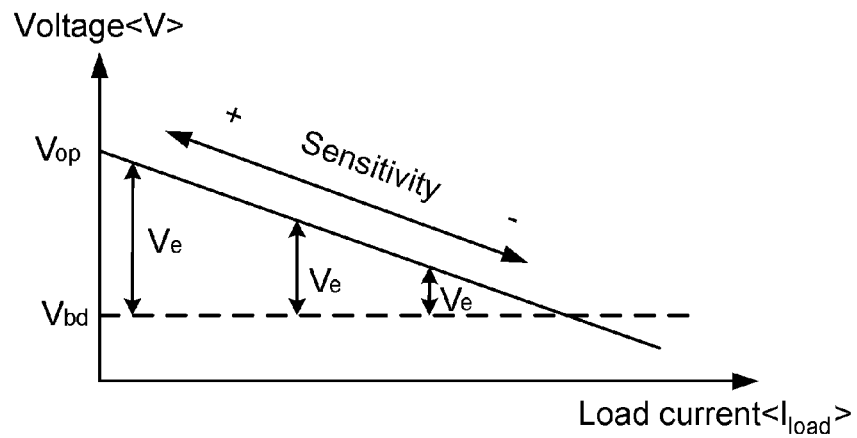
FIG. 2 (prior art) illustrates a relationship between a load current and the excess bias level of a SPAD.
Figure 3:
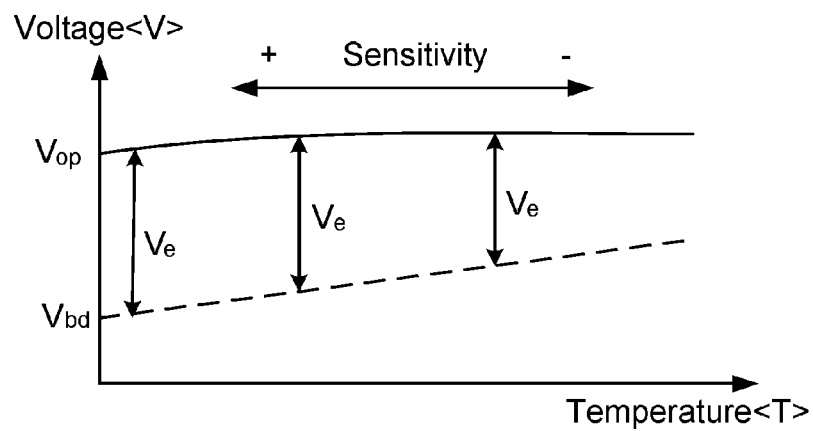
FIG. 3 (prior art) illustrates a relationship between a temperature and the excess bias level of the SPAD.
Figure 4:
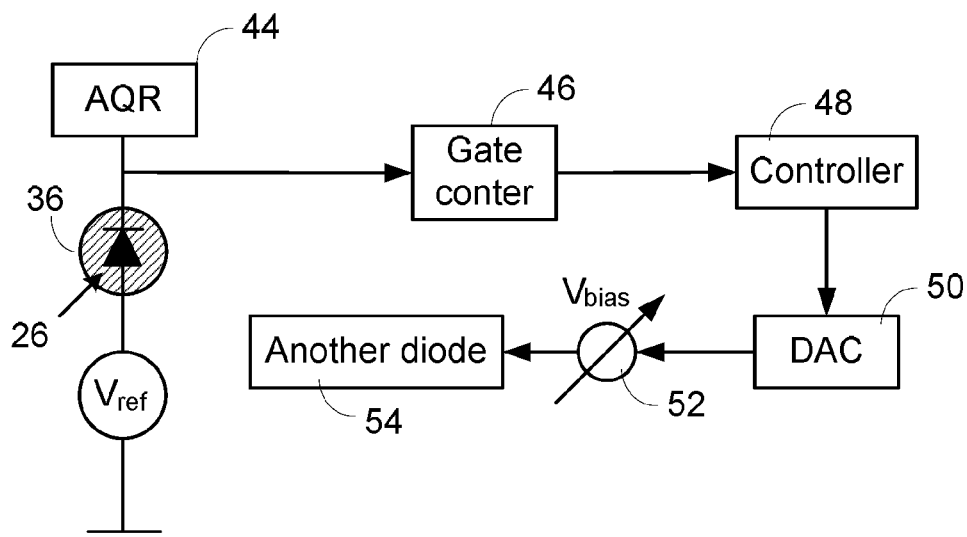
FIG. 4 (prior art) illustrates a bias adjusting circuit of an ordinary SPAD.
Figure 5:
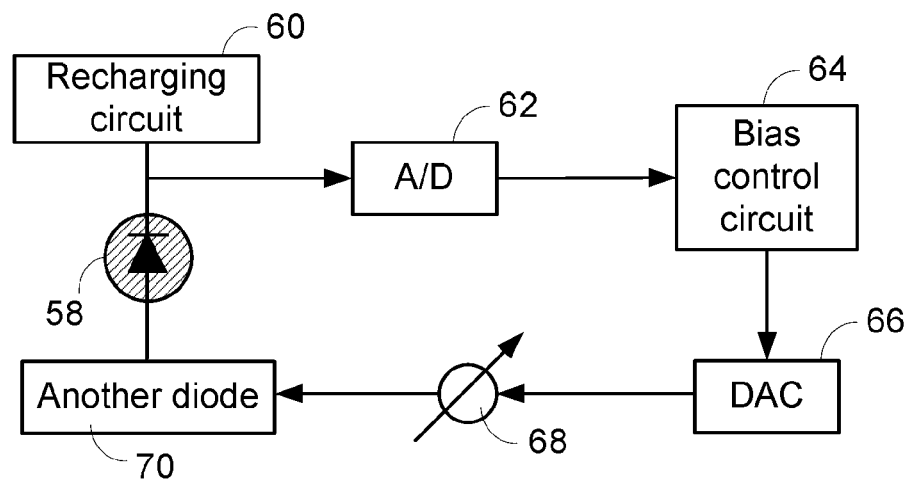
FIG. 5 (prior art) illustrates a temperature compensated and control circuit of the ordinary SPAD.
Figure 6:
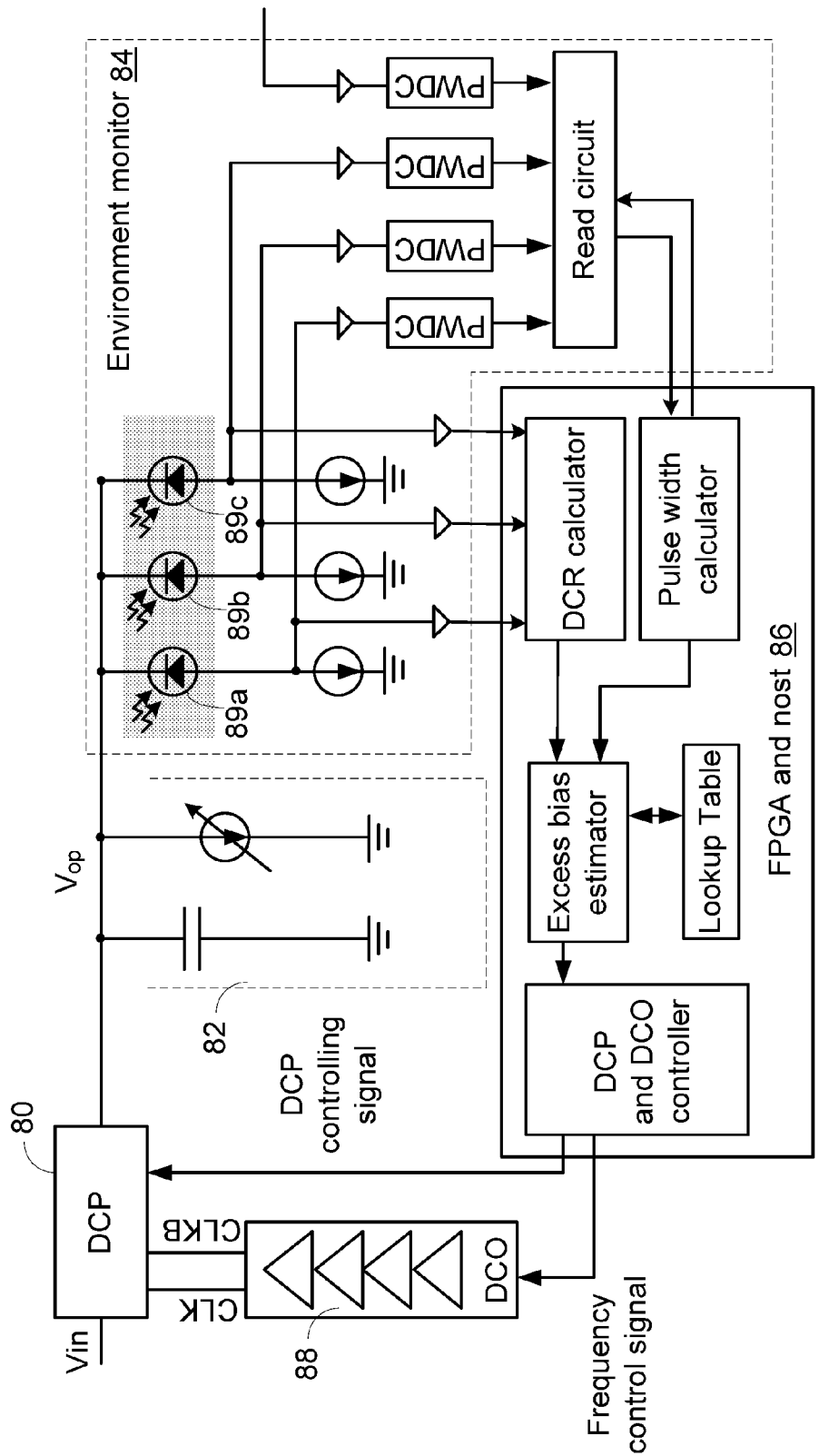
FIG. 6 (prior art) illustrates a temperature and load compensated method performed in the SPAD.
Figure 7A:
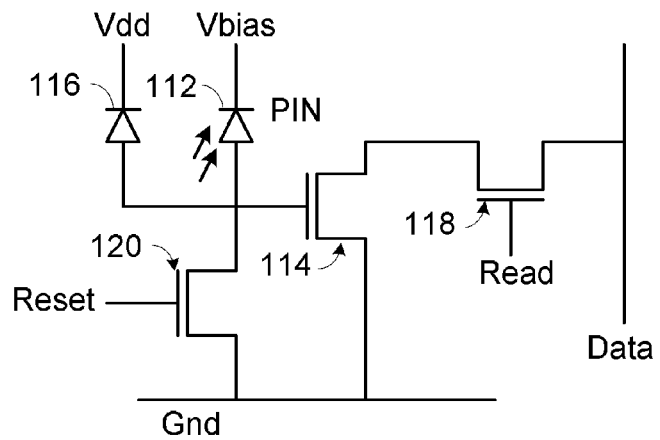
FIGS. 7A and 7B (prior art) illustrate an ordinary high dynamic photo detector and an operating method thereof.
Figure 7B:
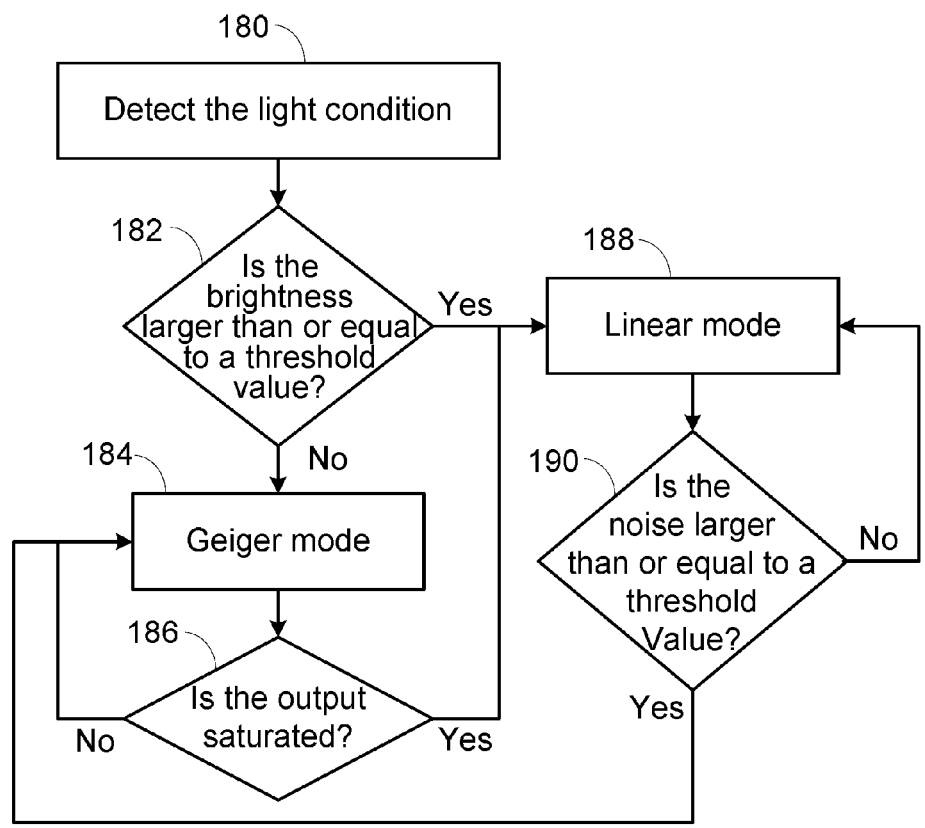
Figure 8:
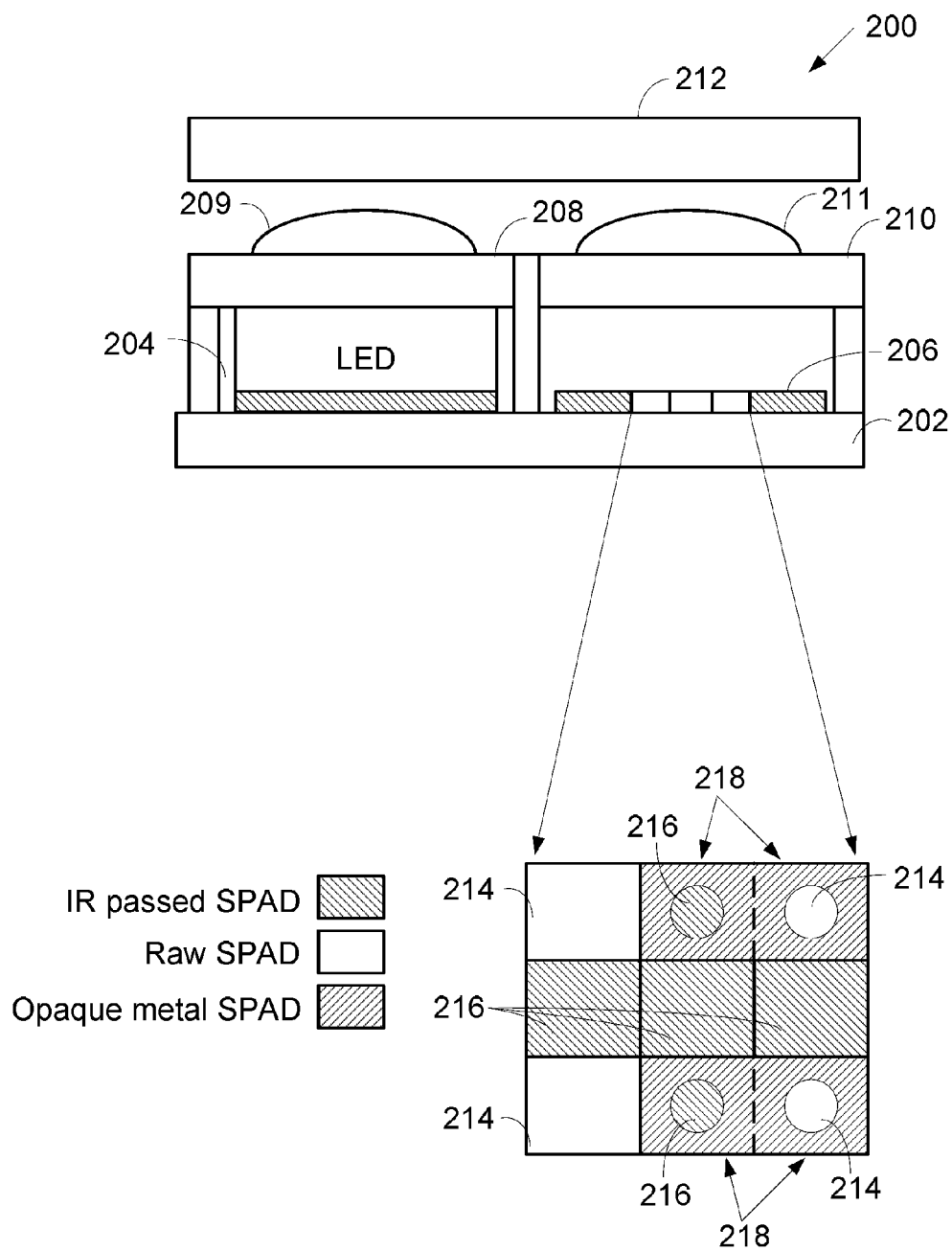
FIG. 8 (prior art) illustrates an environment light detecting system and a method thereof.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Please referring to FIGS. 9A to 9C, which illustrate a SPAD detecting circuit and signals thereof. The SPAD detecting circuit includes a power supply 310, a SPAD and a load R. The power supply 310 can output a supply voltage $V_{op}$. A cathode terminal of the SPAD receives the supply voltage $V_{op}$. When the SPAD receives photons, the anode terminal outputs an output voltage signal $V_{anode}$. A first terminal of the load is connected to the anode terminal of the SPAD. A second terminal of the load is connected to a ground voltage Gnd.

If the SPAD is operated at the Geiger mode, the supply voltage $V_{op}=V_{bd}+V_e$. $V_{bd}$ is a breakdown voltage and $V_e$ is an excess bias level. When the SPAD does not receive any photon, a sensing current I (or a load current) is quiescent. At this time period, the SPAD is off, and the output voltage signal $V_{anode}$ of the anode terminal is kept at the Gnd level.

At time t1, the SPAD receives the photons and the sensing current I is increased. At this time point, the SPAD is on and the sensing current I flows through the load which results in a voltage drop (I×R), such that the output voltage signal $V_{anode}$ of the anode terminal is increased from the Gnd level. When the output voltage signal $V_{anode}$ of the anode terminal is increased to a quenching level, i.e., the voltage drop of the SPAD is decreased to the breakdown voltage level $V_{bd}$, the current of the SPAD is gradually to be cut-off and consequently the output voltage signal $V_{anode}$ of the anode terminal is decreased to the Gnd level at time t2.

When the SPAD receives the photons again, the operation from the time t1 to the time t2 is repeated.

Figure 10A:
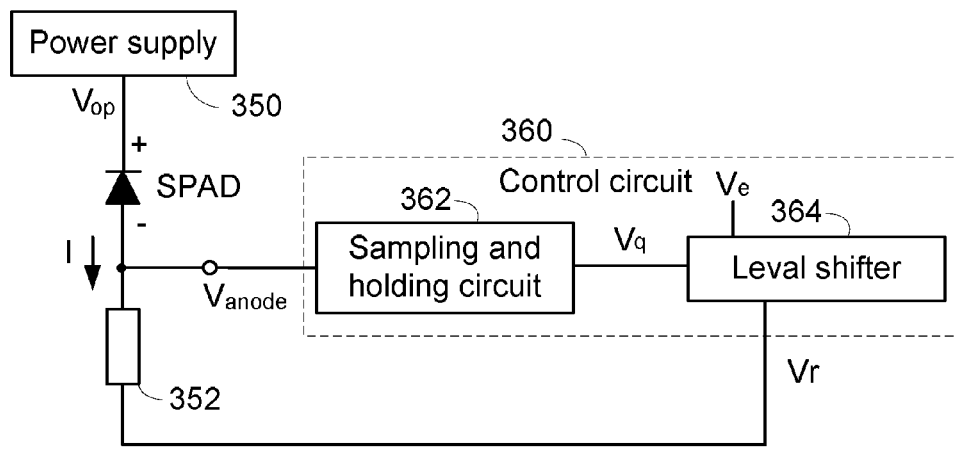
FIGS. 10A and 10B illustrate a system for controlling an excess bias of a SPAD and a signal thereof according to a first embodiment.

FIG. 10A illustrates a system for controlling an excess bias of a SPAD according to a first embodiment. The system for controlling the excess bias of the SPAD includes a power supply 350, a SPAD, a load 352 and a control circuit 360. The control circuit 360 includes a sampling and holding circuit 362 and a level shifter 364.

The power supply 350 can output a supply voltage $V_{op}$. A cathode terminal of the SPAD receives the supply voltage $V_{op}$. After receiving photons, the anode terminal outputs related events at the output voltage signal $V_{anode}$. A first terminal of the load 352 is connected to the anode terminal of the SPAD. The sampling and holding circuit 362 receives the output voltage signal $V_{anode}$ from the anode terminal and outputs a quenching level $V_q$. The level shifter 364 receives the excess bias level $V_e$ and transfers the quenching level $V_q$ to be a reset level $V_r$, such that a second terminal of the load 352 receives the reset level $V_r$. The reset level $V_r$ is equal to a value obtained by subtracting the quenching level $V_q$ from the excess bias level $V_e$. The power supply 350 can be a charge pump circuit and the load 352 can be a resistor.

The supply voltage $V_{op}$ from the power supply 350 and the breakdown voltage level $V_{bd}$ of the SPAD may shift with the conditions of the environment. In the present embodiment, the sampling and holding circuit 362 accurately obtains the quenching level $V_q$ of the SPAD. The level shifter 364 adds the excess bias level $V_e$ and the quenching level $V_q$ together to obtain the reset level $V_r$. The second terminal of the load 352 receives the reset level $V_r$.

Figure 10B:
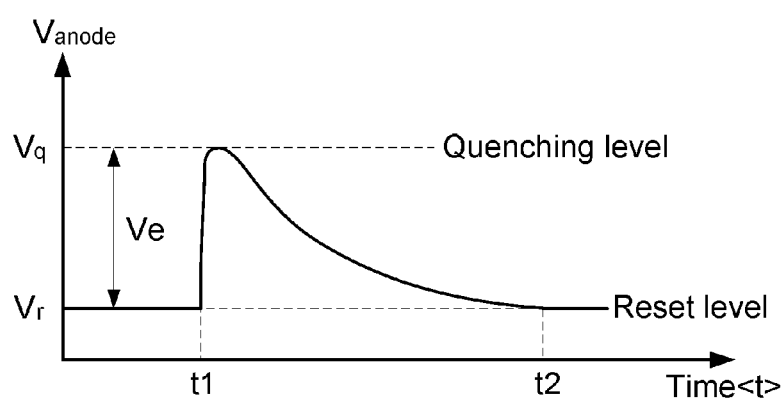

Please refer to FIG. 10B, which illustrates a signal of the system for controlling the excess bias of the SAPD. At time t1, the SPAD receives photons and is triggered on. A sensing current I is induced, such that the level of the output voltage signal $V_{anode}$ at the anode terminal is increased and reached the quenching level $V_q$. At this time point, the quenching level $V_q$ is equal to a value obtained by subtracting the breakdown voltage level $V_{bd}$ from the supply voltage $V_{op}$ $$V_q = V_{op} - V_{bd} \quad (1)$$

The extreme voltage level of the output voltage signal $V_{anode}$ obtained from the anode terminal by the sampling and holding circuit 362 is the quenching level $V_q$. When the output voltage signal $V_{anode}$ of the anode terminal reaches the quenching level $V_q$, the SPAD is turned off and the output voltage signal $V_{anode}$ of the anode terminal is gradually decreased to the Gnd level at time t2.

When the sampling and holding circuit 362 provides the quenching level $V_q$ to the level shifter 364, the level shifter 364 adds the excess bias level $V_e$ and the quenching level $V_q$ together to obtain the reset level $V_r$, such that the second terminal of the load 352 receives the reset level $V_r$. The reset level $V_r$ is equal to a value obtained by subtracting the excess bias level $V_e$ from the quenching level $V_q$.

$$V_r = V_q - V_e \quad (2)$$

According to the equations (1) and (2), an equation "$V_{op} - V_r = V_{bd} + V_e$" can be obtained. That is to say, when the SPAD is off, the voltage drop of the SPAD is a value obtained by adding the breakdown voltage level $V_{bd}$ and the excess bias level $V_e$.

Based on the above, no matter how much the supply voltage $V_{op}$ provided from the power supply 350 and the breakdown voltage level $V_{bd}$ of the SPAD are shifted, the quenching level will shift upon the variations and keeps the excess bias level of the SPAD always equal to $V_e$. Therefore, the SPAD of the first embodiment can accurately provide the excess bias level $V_e$. Furthermore, the excess bias level $V_e$ received by the level shifter 364 can be tuned to adjust a Photon Detection Probability (PDP) of the SPAD, such that the system of the first embodiment is widely dynamic.

Figure 11:
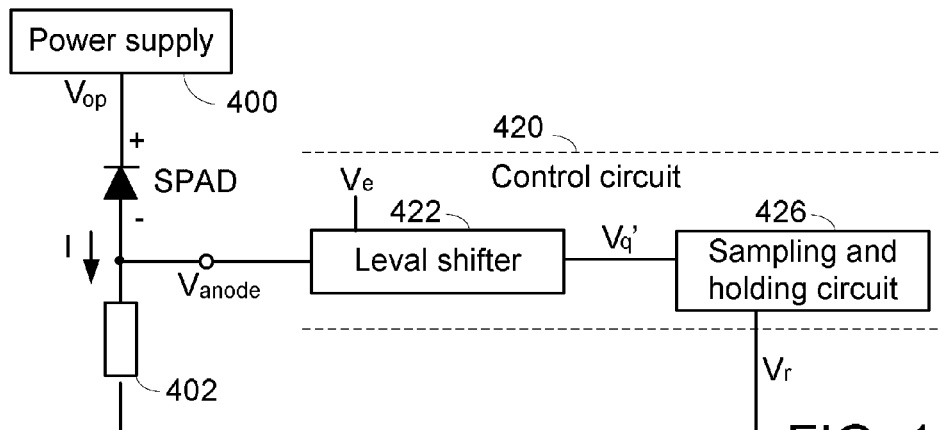
FIG. 11 illustrates a system for controlling an excess bias of a SPAD according to a second embodiment.

Please refer to FIG. 11, which illustrates a system for controlling an excess bias of a SPAD according to a second embodiment. The system for controlling the excess bias of the SPAD includes a power supply 400, a SPAD, a load 402 and a control circuit 420. The control circuit 420 includes a level shifter 422 and a sampling and holding circuit 426.

The difference between the first embodiment and the second embodiment is in the control circuit 420. The level shifter 422 adds the excess bias level $V_e$ and the output voltage signal $V_{anode}$ together to obtain a first voltage signal $V_q'$ ($V_q' = V_{anode} + V_e$). The extreme voltage level of the first voltage signal $V_q'$ obtained by the sampling and holding circuit 426 is taken as the reset level $V_r$. Similarly, an equation "$V_{op} - V_r = V_{bd} + V_e$" can be also obtained. When the SPAD is off, the voltage drop of the SPAD is a value obtained by adding the breakdown voltage level $V_{bd}$ and the excess bias level $V_e$ together.

Figure 12:
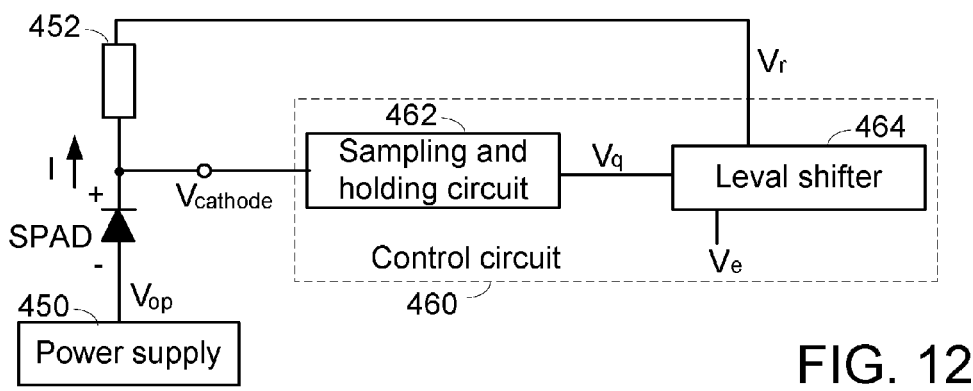
FIG. 12 illustrates a system for controlling an excess bias of a SPAD according to a third embodiment.

Please refer to FIG. 12, which illustrates a system for controlling an excess bias of a SPAD according to a third embodiment. The system for controlling the excess bias of the SPAD includes a power supply 450, a SPAD, a load 452 and a control circuit 460. The control circuit 460 includes a sampling and holding circuit 462 and a level shifter 464.

The power supply 450 can generate a supply voltage $V_{op}$. The anode terminal of the SPAD receives the supply voltage $V_{op}$. The cathode terminal receives photons and outputs the events at the output voltage signal $V_{cathode}$. The first terminal of the load 452 is connected to the cathode terminal of the SPAD. The sampling and holding circuit 462 receives the output voltage signal $V_{cathode}$ of the cathode terminal and generates the quenching level $V_q$. The level shifter 464 receives the excess bias level $V_e$ and adds the quenching level $V_q$ and the excess bias level $V_e$ to obtain the reset level $V_r$, such that the second terminal of the load 452 receives the reset level $V_r$. The reset level $V_r$ is equal to a value obtained by adding the quenching level $V_q$ and the excess bias level $V_e$, i.e., $V_r = V_q + V_e$. The power supply 450 can be a charge pump circuit and the load 452 can be a resistor.

Similarly, as the SPAD receives a photon and induces the sensing current I, the level of the output voltage signal $V_{cathode}$ from the cathode terminal is decreased to the quenching level $V_q$. At this time point, the extreme voltage level of the output voltage signal $V_{cathode}$ obtained from the cathode terminal by the sampling and holding circuit 462 is taken as a quenching level $V_q$. At this time point, the reset level $V_r$ is a value obtained by adding the supply voltage $V_{op}$ and the breakdown voltage level $V_{bd}$.

$$V_q = V_{op} + V_{bd} \tag{3}$$

When the sampling and holding circuit 462 provides the quenching level $V_q$ to the level shifter 464, the level shifter 464 add the excess bias level $V_e$ and the quenching level $V_q$ together to obtain the reset level $V_r$, such that a second terminal of the load 452 receives the reset level $V_r$. The reset level $V_r$ is equal to a value obtained by adding the quenching level $V_q$ and the excess bias level $V_e$.

$$V_r = V_q + V_e \tag{4}$$

According to the equations (3) and (4), an equation "$V_r - V_{op} = V_{bd} + V_e$" can be obtained. When the SPAD is off, the voltage drop of the SPAD is a value obtained by adding the breakdown voltage level $V_{bd}$ and the excess bias level $V_e$.

Figure 13:
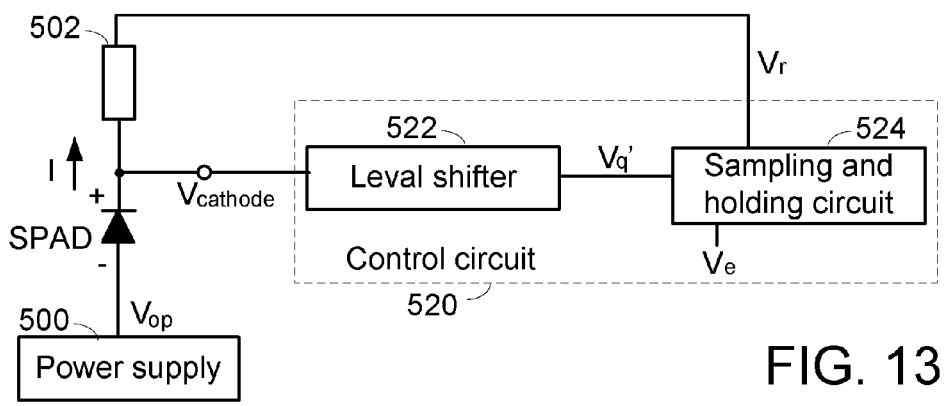
FIG. 13 illustrates a system for controlling an excess bias of a SPAD according to a fourth embodiment.

Please refer to FIG. 13, which illustrates a system for controlling an excess bias of a SPAD according to a fourth embodiment. The system for controlling the excess bias of the SPAD includes a power supply 500, a SPAD, a load 502 and a control circuit 520. The control circuit 520 includes a level shifter 522 and a sampling and holding circuit 524.

The difference between the third embodiment and the fourth embodiment is in the control circuit 520. The level shifter 522 adds the excess bias level $V_e$ and the output voltage signal $V_{cathode}$ of a cathode terminal to obtain the first voltage signal $V_q'$ ($V_q' = V_{cathode} + V_e$). The sampling and holding circuit 524 obtains the extreme voltage level of the first voltage signal $V_q'$ to output the reset level $V_r$. Similarly, an equation "$V_{op} - V_r = V_{bd} + V_e$" can be also obtained. That is to say, when the SPAD is off, the voltage drop of the SPAD is a value obtained by adding the breakdown voltage level $V_{bd}$ and the excess bias level $V_e$.

Figure 14:
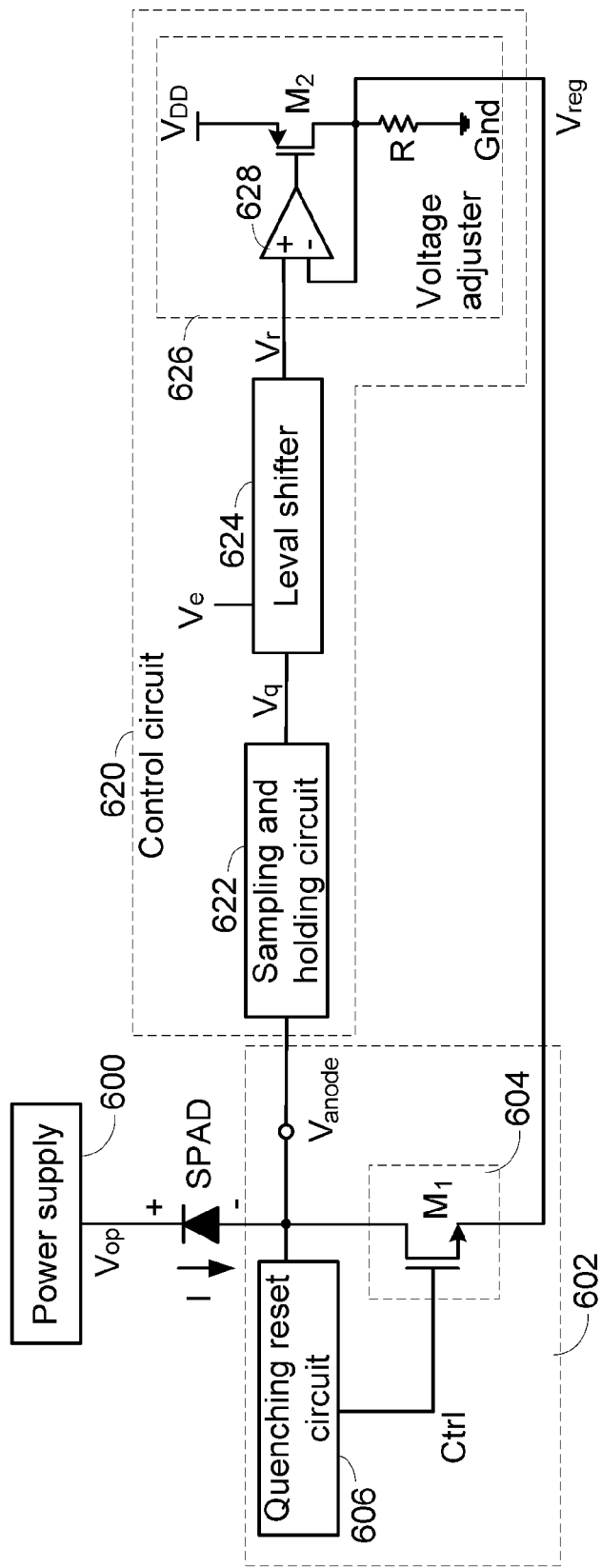
FIG. 14 illustrates a system for controlling an excess bias of a SPAD according to the fifth embodiment.

Please refer to FIG. 14, which illustrates a system for controlling an excess bias of a SPAD according to the fifth embodiment. The system for controlling the excess bias of the SPAD includes a power supply 600, a SPAD, a load 602 and a control circuit 620. The load 602 includes a transistor $M_1$ and a quenching reset circuit 606. The control circuit 620 includes a sampling and holding circuit 622, a level shifter 624 and a voltage regulator 626. The power supply 600 can be a charge pump circuit.

The power supply 600 can generate a supply voltage $V_{op}$. A cathode terminal of the SPAD receives the supply voltage $V_{op}$. The anode terminal generates the output voltage signal $V_{anode}$. A first terminal of the load 602 is connected to the anode terminal of the SPAD. The sampling and holding circuit 622 receives the output voltage signal $V_{anode}$ of the anode terminal and outputs the quenching level $V_q$. The level shifter 624 receives the excess bias level $V_e$ and adds the quenching level $V_q$ and the excess bias level $V_e$ together to obtain the reset level $V_r$. The voltage regulator 626 receives the reset level $V_r$ and outputs a regulating voltage $V_{reg}$. The second terminal of the load 602 receives the regulating voltage $V_{reg}$. The reset level $V_r$ is equal to a value obtained by subtracting the excess bias level $V_e$ from the quenching level $V_q$. The reset level $V_r$ is equal to the regulating voltage $V_{reg}$.

The voltage regulator 626 of the control circuit 620 can enhance an output driving ability, such that the second terminal of the load 602 can quickly settle at the reset level $V_r$. The voltage regulator 626 includes an operational amplifier 628. The positive input terminal of the operational amplifier 628 receives the reset level $V_r$. The negative input terminal of the operational amplifier 628 generates the regulating voltage $V_{reg}$. In the transistor $M_2$, a source receives a supply voltage $V_{DD}$, a drain is connected to the negative input terminal of the operational amplifier 628, and a gate is connected to an output terminal of the operational amplifier 628. The transistor R is connected between the negative terminal of the operational amplifier 628 and the ground voltage Gnd. In the fifth embodiment, the quenching reset circuit 606 of the load 602 generates a control signal for that the sampling and holding circuit 622 can accurately obtains the quenching level $V_q$. The operations are described as below.

When the SPAD receives photons and is triggered on, the sensing current I is induced. The output voltage signal $V_{anode}$ of the anode terminal is increased to the quenching level $V_q$. At this time point, the quenching reset circuit 606 generates a controlling signal Ctrl to a gate (control terminal) of the transistor $M_1$ for turning off the transistor $M_1$, such that a path on the anode terminal of the SPAD is opened. Therefore, the quenching level $V_q$ will be kept for a long time. The sampling and holding circuit 622 can accurately obtain the quenching level $V_q$.

In other words, the voltage regulator 626 of the fifth embodiment is used to enhance an output driving ability of the control circuit 620. The second terminal of the load 602 receives the regulating voltage $V_{reg}$ (i.e. the reset level $V_r$). The quenching reset circuit 606 of the fifth embodiment is used to keep the quenching level $V_q$ for a longer time, such that the sampling and holding circuit 622 can accurately obtain the quenching level $V_q$. When the SPAD is off, the voltage drop of the SPAD is a value obtained by adding the breakdown voltage level $V_{bd}$ and the excess bias level $V_e$ (i.e. $V_{op} - V_r = V_{bd} + V_e$).

Figure 15:
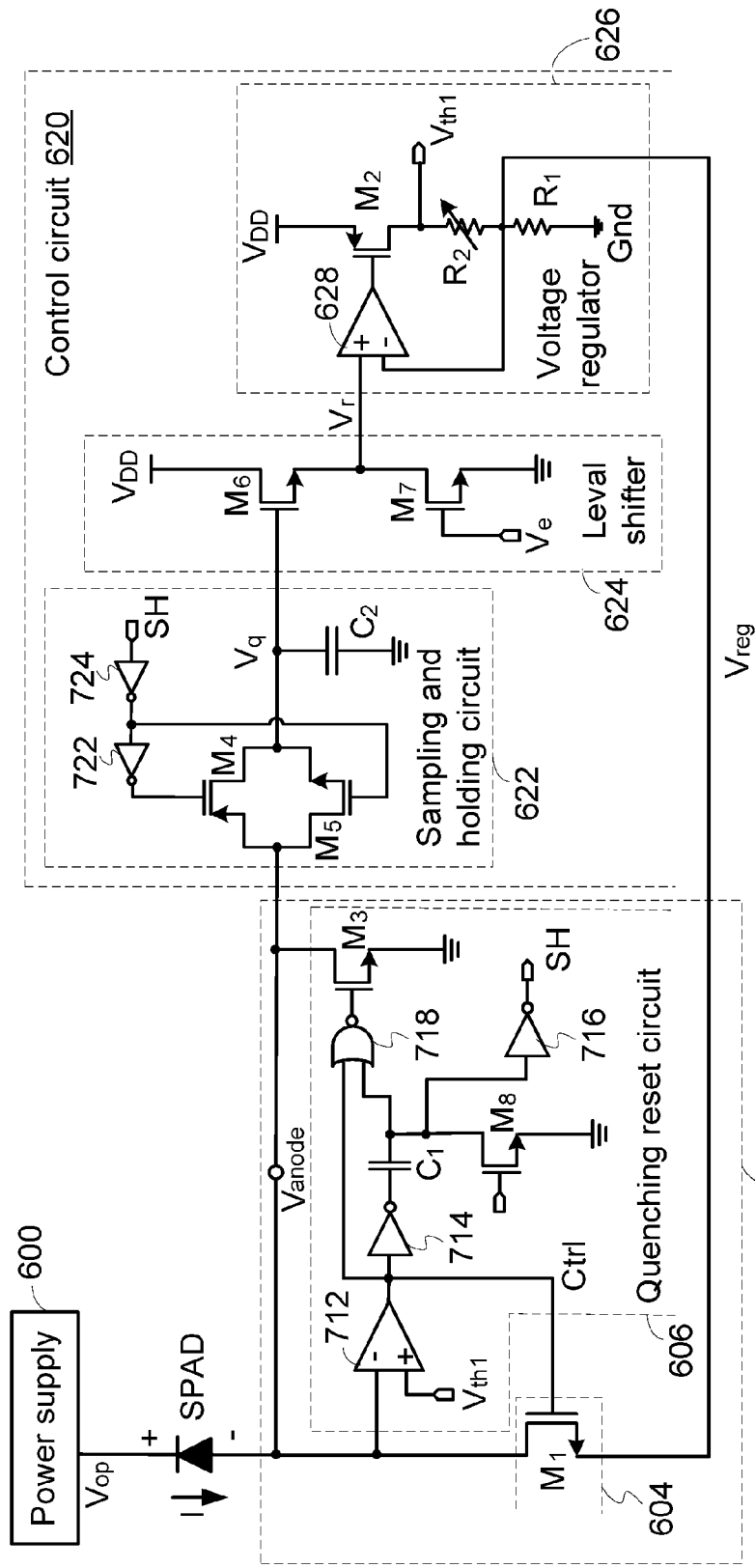
FIG. 15 illustrates a detail circuit diagram according to the fifth embodiment.

Please refer to FIG. 15, which illustrates a detail circuit diagram according to the fifth embodiment. The sampling and holding circuit 622 and the level shifter 624 can be used in the first embodiment to the fifth embodiment.

The quenching reset circuit 606 includes a comparator 712, an inverter 714, an inverter 716, a NOR 718, a capacitor $C_1$, a transistor $M_8$ and a transistor $M_3$. A negative terminal of the comparator 712 receives the output voltage signal $V_{anode}$ of an anode terminal. A positive terminal of the comparator 712 receives a reference threshold voltage level $V_{th1}$. An output terminal of the comparator 712 outputs the controlling signal Ctrl. When the SPAD receives photons and is triggered on, the sensing current I is induced, such that the output voltage signal $V_{anode}$ of the anode terminal raises across the threshold voltage $V_{th1}$. The comparator 712 generates the controlling signal Ctrl to the gate of the transistor $M_1$ to turn off the transistor $M_1$, such that the path of the anode terminal of the SPAD is opened.

The inverter 714, the capacitor C1, and the transistor $M_8$ in the quenching reset circuit 606 realize a monostable circuit. When the controlling signal Ctrl is induced, the transistor $M_8$ generates a pulse signal and the output terminal of the inverter 716 outputs a control signal SH to the sampling and holding circuit 622. A gate of the transistor $M_8$ receives a control voltage to adjust the current and correspondingly the width of the pulse signal. The output terminal of the NOR 718 is used for controlling the transistor $M_3$. At a specific time, the transistor $M_3$ is turned on to reset the voltage level of the anode terminal of the SPAD to the Gnd level.

The sampling and holding circuit 622 includes an inverter 722, an inverter 724, a transmission gate, and a capacitor $C_2$. The transmission gate includes a transistor $M_4$ and a transistor $M_5$. When the control signal SH is high, the transmission gate is turned on and the extreme voltage level of the output voltage signal $V_{anode}$ of the anode terminal is sampled and hold in the capacitor $C_2$. In other words, the voltage of the capacitor $C_2$ is equal to the quenching level $V_r$.

The level shifter 624 includes a transistor $M_6$ and a transistor $M_7$ which realize a source follower. A gate of the transistor $M_6$ receives the quenching level $V_q$, and a gate of the transistor $M_7$ receives the excess bias level $V_e$ and an output terminal generates the reset level $V_r$. The reset level $V_r$ is equal to a value obtained by subtracting the excess bias level $V_e$ from the quenching level $V_q$.

The voltage regulator 626 includes the operational amplifier 628. A positive terminal of the operational amplifier 628 receives the reset level $V_r$, the negative terminal of the operational amplifier 628 connects to the regulating voltage $V_{reg}$. A gate of the transistor $M_2$ is connected to the output terminal of the operational amplifier 628. A source of the transistor $M_2$ receives the supply voltage $V_{DD}$. The drain of the transistor $M_2$ and the negative terminal of the operational amplifier 628 are connected to a resistor $R_2$. A resistor $R_1$ is connected between the negative terminal of the operational amplifier 628 and the ground level Gnd. The voltage regulator 626 can enhance an output driving ability, such that the second terminal of the load 602 can quickly settle at the reset level $V_r$.

The drain of the transistor $M_2$ can generate a threshold voltage $V_{th1}$ to the quenching reset circuit 606. $V_{th1}=V_{reg}(1+R_2/R_1)$. The threshold voltage can be adjusted by tuning the ratio of R2 and R1 and optimized to reduce timing jitter of SPADs.

Figure 16:
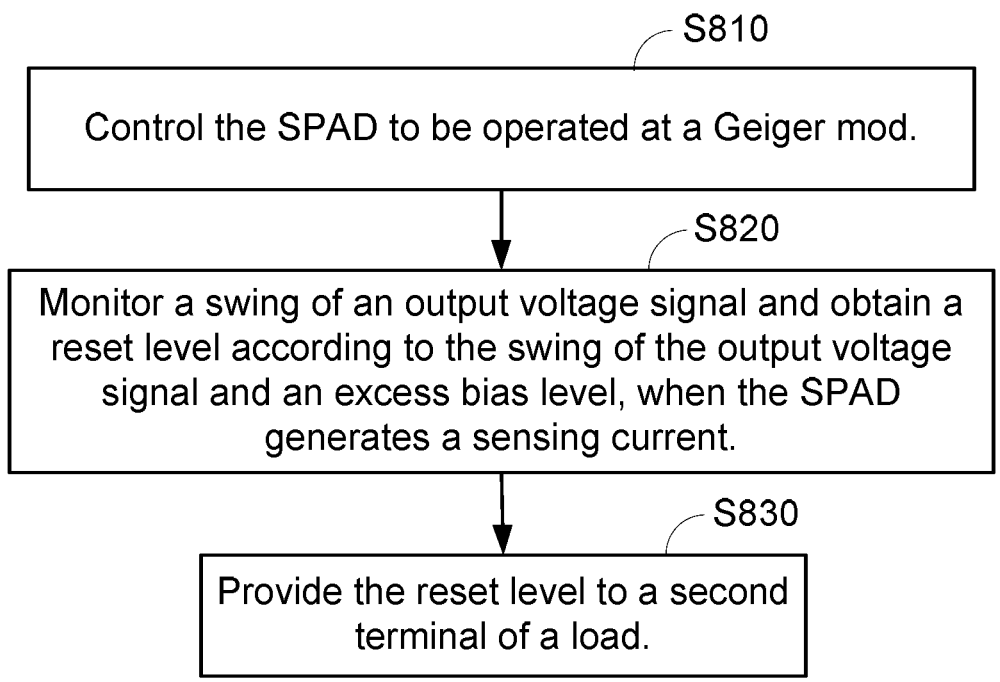
FIG. 16 illustrates a method for controlling an excess bias of a SPAD.

Please refer to FIG. 16, which illustrates a method for controlling an excess bias of a SPAD. A first terminal of the SPAD is connected to a power supply for receiving a supply voltage $V_{op}$. A second terminal of the SPAD can generate an output voltage signal. A first terminal of a load is connected to a second terminal of the SPAD. A second terminal of the load receives a reset level. The method includes the following steps.

In step S810, the SPAD is operated at a Geiger mode. In step S820, when the SPAD induces a sensing current, the swing of the output voltage signal is monitored and a reset level is obtained according to the swing of the output voltage signal and an excess bias level. In step S830, the reset level is provided to a second terminal of the load.

In step S820, the swing of the output voltage signal from a second terminal of the SPAD is sampled to obtain an extreme voltage level which is defined and taken as a quenching level. The quenching level and the excess bias level are summed together to obtain the reset level.

Or, in step S820, the output voltage signal and the excess bias level are summed together to obtain a first voltage signal. The swing of the first voltage signal is monitored to obtain an extreme voltage level which is defined and taken as a reset level.

Or, in step S820, the excess bias is divided into a plurality of small excess biases. The step of adding the output voltage signal and the excess bias together can be performed by adding the output voltage signal and the small excess biases several times.

Based on the above, no matter how much the supply voltage $V_{op}$ provided from the power supply and the breakdown voltage level $V_{bd}$ of the SPAD drift, a voltage drop of the SPAD can be accurately controlled at a value obtained by adding the breakdown voltage level $V_{bd}$ and the excess bias level $V_e$.

Because the excess bias level of the SPAD can be accurately controlled, the excess bias level $V_e$ received by the level shifter can be tuned to obtain a high dynamic range controlling system.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A system for controlling an excess bias of a single photon avalanche photo diode (SPAD), comprising:
   a power supply generating a supply voltage;
   a SPAD having a first terminal and a second terminal, the first terminal receiving the supply voltage, the second terminal generating an output voltage signal;
   a control circuit connected to the second terminal of the SPAD, wherein the control circuit obtains a reset level according to a swing of the output voltage signal and an excess bias level which is inputted to the control circuit; and
   a load having a first terminal and a second terminal, the first terminal of the load connected to the second terminal of the SPAD, the second terminal of the load connected to the control circuit for receiving the reset level.

2. The system for controlling the excess bias according to claim 1, wherein a cathode terminal of the SPAD receives the supply voltage, and an anode terminal of the SPAD generates the output voltage signal.

3. The system for controlling the excess bias according to claim 2, wherein the control circuit comprises:
   a sampling and holding circuit obtaining an extreme voltage level according to the swing of the output voltage signal, the extreme voltage level being taken as a quenching level; and
   a level shifter receiving the excess bias level and subtracting the excess bias level from the quenching level to obtain the reset level.

4. The system for controlling excess bias according to claim 3, wherein the control circuit includes a voltage regulator receiving the reset level and enhancing an output driving ability of the control circuit, such that the second terminal of the load quickly settles at the reset level.

5. The system for controlling the excess bias according to claim 2, wherein the control circuit comprises:
   a level shifter receiving the output voltage signal and the excess bias level, and subtracting the excess bias level from the output voltage signal to obtain a first voltage signal; and
   a sampling and holding circuit obtaining an extreme voltage level according to the swing of the first voltage signal, the extreme voltage level being taken as the reset level.

6. The system for controlling excess bias according to claim 5, wherein the control circuit includes a voltage regulator receiving the reset level and enhancing an output driving ability of the control circuit, such that the second terminal of the load quickly settles at the reset level.

7. The system for controlling the excess bias according to claim 1, wherein an anode terminal of the SPAD receives the supply voltage, and a cathode terminal of the SPAD generates the output voltage signal.

8. The system for controlling the excess bias according to claim 7, wherein the control circuit comprises:
  a sampling and holding circuit obtaining an extreme voltage level according to the swing of the output voltage signal, the extreme voltage level being taken as a quenching level; and
  a level shifter receiving the excess bias level and adding the quenching level and the excess bias level together to obtain the reset level.

9. The system for controlling excess bias according to claim 8, wherein the control circuit includes a voltage regulator receiving the reset level and enhancing an output driving ability of the control circuit, such that the second terminal of the load quickly settles at the reset level.

10. The system for controlling the excess bias according to claim 7, wherein the control circuit comprises:
  a level shifter receiving the output voltage signal and the excess bias level, and adding the output voltage signal and the excess bias level together to obtain a first voltage signal; and
  a sampling and holding circuit obtaining an extreme voltage level according to a swing of the first voltage signal, the extreme voltage level being taken as the reset level.

11. The system for controlling excess bias according to claim 10, wherein the control circuit includes a voltage regulator receiving the reset level and enhancing an output driving ability of the control circuit, such that the second terminal of the load quickly settles at the reset level.

12. The system for controlling the excess bias according to claim 1, further comprising a quenching reset circuit, wherein the quenching reset circuit receives the output voltage signal and controls the first terminal of the load and the second terminal of the load to be opened.

13. The system for controlling excess bias according to claim 12, wherein the control circuit includes a voltage regulator receiving the reset level and enhancing an output driving ability of the control circuit, such that the second terminal of the load quickly settles at the reset level.

14. A method for controlling an excess bias of a single photon avalanche photo diode (SPAD), comprising:
  controlling a SPAD being operating at a Geiger mode, wherein a first terminal of the SPAD is connected to a power supply, a second terminal of the SPAD generates an output voltage signal, a first terminal of a load is connected to the second terminal of the SPAD, and a second terminal of the load receives a reset level;
  inputting an excess bias level;
  monitoring a swing of the output voltage signal and obtaining the reset level according to the swing of the output voltage signal and the excess bias level, when the SPAD induces a sensing current; and
  providing the reset level to the second terminal of the load.

15. The method for controlling the excess bias according to claim 14, further comprising:
  monitoring the swing of the output voltage signal generated by the SPAD, and obtaining an extreme voltage level being taken as a quenching level; and
  adding the quenching level and the excess bias level together to obtain the reset level.

16. The method for controlling the excess bias according to claim 14, further comprising:
  adding the output voltage signal generated by the SPAD and the excess bias level together to obtain a first voltage signal; and
  monitoring a swing of the first voltage signal, and obtaining an extreme voltage level taken as the reset level.

* * * * *